United States Patent
Etou et al.

(10) Patent No.: US 9,327,464 B2
(45) Date of Patent: May 3, 2016

(54) INTERMEDIATE TRANSFER BELT AND IMAGE FORMING APPARATUS

(71) Applicant: Konica Minolta Inc., Tokyo (JP)

(72) Inventors: Kouichi Etou, Toyokawa (JP); Wanli Zhang, Toyokawa (JP); Junji Kanda, Toyokawa (JP); Kazuyoshi Ota, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/721,459

(22) Filed: May 26, 2015

(65) Prior Publication Data
US 2015/0338789 A1    Nov. 26, 2015

(30) Foreign Application Priority Data

May 26, 2014   (JP) .................... 2014-107868

(51) Int. Cl.
*B29D 29/00* (2006.01)
*G03G 15/16* (2006.01)

(52) U.S. Cl.
CPC .............. *B29D 29/00* (2013.01); *G03G 15/162* (2013.01)

(58) Field of Classification Search
CPC ................. G03G 15/1605; G03G 15/162
See application file for complete search history.

(56) References Cited

U.S. PATENT DOCUMENTS

| 7,853,188 B2 * | 12/2010 | Watanabe | G03G 15/0194 399/222 |
| 2007/0282051 A1 | 12/2007 | Okano | |
| 2011/0206422 A1 | 8/2011 | Hirose et al. | |
| 2011/0305487 A1 | 12/2011 | Nakade | |
| 2012/0014724 A1 | 1/2012 | Yamashita et al. | |
| 2012/0230740 A1 * | 9/2012 | Mikami | G03G 15/162 399/308 |

FOREIGN PATENT DOCUMENTS

| JP | 08-160760 A | 6/1996 |
| JP | 11-084890 A | 3/1999 |
| JP | 2011-138031 A | 7/2011 |

OTHER PUBLICATIONS

European Office Action; Application No./Patent No. 15168388.5-1706 / 2949455; dated May 1, 2016; Applicant: Konica Minolta, Inc. total of 8 pages.

* cited by examiner

*Primary Examiner* — Gregory H Curran
(74) *Attorney, Agent, or Firm* — Lucas & Mercanti, LLP

(57) ABSTRACT

An intermediate transfer belt used for an image forming apparatus of an electrophotographic system includes: an elastic layer; and a surface layer formed on the elastic layer, wherein stress relief time τ [ms] of a material used for the elastic layer and hardness H [MPa] of the surface layer satisfy a first condition that $0.48<\tau<0.75$ and $50<H<6275\tau^3-13820\tau^2+10140\tau-2330$ or a second condition that $0.75 \leq \tau$ and $50<H<150$.

8 Claims, 3 Drawing Sheets

INTERMEDIATE TRANSFER BELT AND IMAGE FORMING APPARATUS

The entire disclosure of Japanese Patent Application No. 2014-107868 filed on May 26, 2014 including description, claims, drawings, and abstract are incorporated herein by reference in its entirety.

BACKGROUND OF THE INVENTION

1. Field of the Invention

The present invention relates to an intermediate transfer belt which is used for an image forming apparatus of an electrophotographic system, and an image forming apparatus including the intermediate transfer belt.

2. Description of the Related Art

Conventionally, an image forming apparatus of an electrophotographic system (a copier, a laser beam printer, etc.) uses an intermediate transfer belt. The intermediate transfer belt is a belt for transferring a toner image held on a photoconductor drum, etc., onto paper, etc. For a scheme for achieving a further improvement in image quality, there is a technique in which an elastic layer is provided to an intermediate transfer belt.

By the presence of the elastic layer in the intermediate transfer belt, stress occurring due to contact of thick paper (e.g., paper with a thickness of the order of 300 μm), etc., is distributed, and stress on a toner image is reduced and the followability to a rough texture of a transfer material is improved. By this, transfer efficiency can be improved. For a method of providing elasticity to the intermediate transfer belt, in general, rubber materials (NBR, CR, ECO, etc.) are often used.

However, the rubber materials have high surface adhesion and also have a low wear resistance. Thus, measures need to be taken against the high surface adhesion and the low wear resistance. As one method for the measures, there is known a technique for forming, on a soft elastic layer, a surface layer which is harder than the elastic layer. For example, JP 11-84890 A, JP 8-160760 A, and JP 2011-138031 A propose that a surface layer higher in hardness than rubber is formed on an elastic layer (rubber layer) to provide a release function.

However, According to the above-described technique, since the surface layer is still too soft, when the intermediate transfer belt is durably used, the surface layer is abraded due to friction of contact members, causing a problem of loss of the release function. To solve this problem, an increase in the hardness of the surface layer is considered. As a result, abrasion of the surface layer is suppressed, but since the elastic layer is soft, another problem occurs. Specifically, although the wear resistance improves by increasing the hardness of the surface layer, as shown in FIG. 4, deformation (stress concentration) of the surface layer caused by edge portions of thick paper when the thick paper passes through cannot be borne. As a result, cracking occurs in the surface layer.

In many image forming apparatuses that use an intermediate transfer belt, a belt drive roller that stretches and drives the intermediate transfer belt is used as a secondary transfer counter roller. Hence, in a secondary transfer portion, a surface layer provided on a surface of the intermediate transfer belt is subjected to deformation in a thickness direction of the intermediate transfer belt caused by edges of thick paper, while the surface layer extends in a circumferential direction of the intermediate transfer belt. This leads to a disadvantageous outcome in terms of the suppression of cracking of the surface layer.

SUMMARY OF THE INVENTION

To suppress the occurrence of cracking, if the amount of deformation of the surface layer is suppressed by increasing the elastic modulus of the elastic layer (rubber material), then the followability to rough paper which is an advantage brought about by the provision of the elastic layer degrades, and thus, transfer performance is impaired, which is likely to hinder an improvement in image quality. In view of the above-described problems, an object of the present invention is to provide an intermediate transfer belt which easily suppresses wear and cracking while satisfying transfer performance, and an image forming apparatus including the intermediate transfer belt.

To achieve the abovementioned object, according to an aspect, an intermediate transfer belt used for an image forming apparatus of an electrophotographic system, the intermediate transfer belt reflecting one aspect of the present invention comprises: an elastic layer; and a surface layer formed on the elastic layer, wherein stress relief time $\tau$ [ms] of a material used for the elastic layer and hardness H [MPa] of the surface layer satisfy a first condition that $0.48 < \tau < 0.75$ and $50 < H \leq 6275\tau^3 - 13820\tau^2 + 10140\tau - 2330$ or a second condition that $0.75 \leq \tau$ and $50 < H < 150$.

More specifically, in the above configuration, the stress relief time $\tau$ and the hardness H preferably satisfy a third condition that $0.5 \leq \tau < 0.75$ and $60 \leq H \leq 5333\tau^3 - 12000\tau^2 + 8987\tau - 2100$ or a fourth condition that $0.75 \leq \tau$ and $60 \leq H \leq 140$.

More specifically, in the above configuration, the stress relief time $\tau$ and the hardness H preferably satisfy a fifth condition that $0.6 \leq \tau \leq 0.85$ and $70 \leq H \leq 120$.

More specifically, in the above configuration, the material used for the elastic layer preferably contains a thermally crosslinking rubber material.

More specifically, in the above configuration, a material used for the surface layer is preferably such that surface-treated metal oxide fine particles are contained in a cured resin obtained by curing an active energy ray-curable composition containing polyfunctional (metha)acrylate, polyurethane acrylate, and a polymerizable compound having a low surface energy group.

More specifically, in the above configuration, the polymerizable compound having a low surface energy group is preferably a fluorine-denatured (metha)acrylate.

More specifically, in the above configuration, the polyurethane acrylate preferably has a number average molecular weight of 10000 or more, a stretch rate of 250% or more, and a tensile strength of 200 kgf/cm2 or more.

Further, an image forming apparatus according to an embodiment of the present invention preferably comprises: an image holding body that holds a toner image; the movable intermediate transfer belt; a primary transfer portion that performs primary transfer of the toner image held on the image holding body onto a surface layer of the intermediate transfer belt; and a secondary transfer portion that performs secondary transfer of the toner image transferred onto the intermediate transfer belt, onto a transfer material.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 4 is an illustrative diagram of deformation (stress concentration) of a surface layer occurring when thick paper passes through.

DESCRIPTION OF THE PREFERRED EMBODIMENTS

Hereinafter, an embodiment of the present invention will be described with reference to the drawings. However, the scope of the invention is not limited to the illustrated examples.

1. Summary of a Configuration of an Image Forming Apparatus

Figure 1:
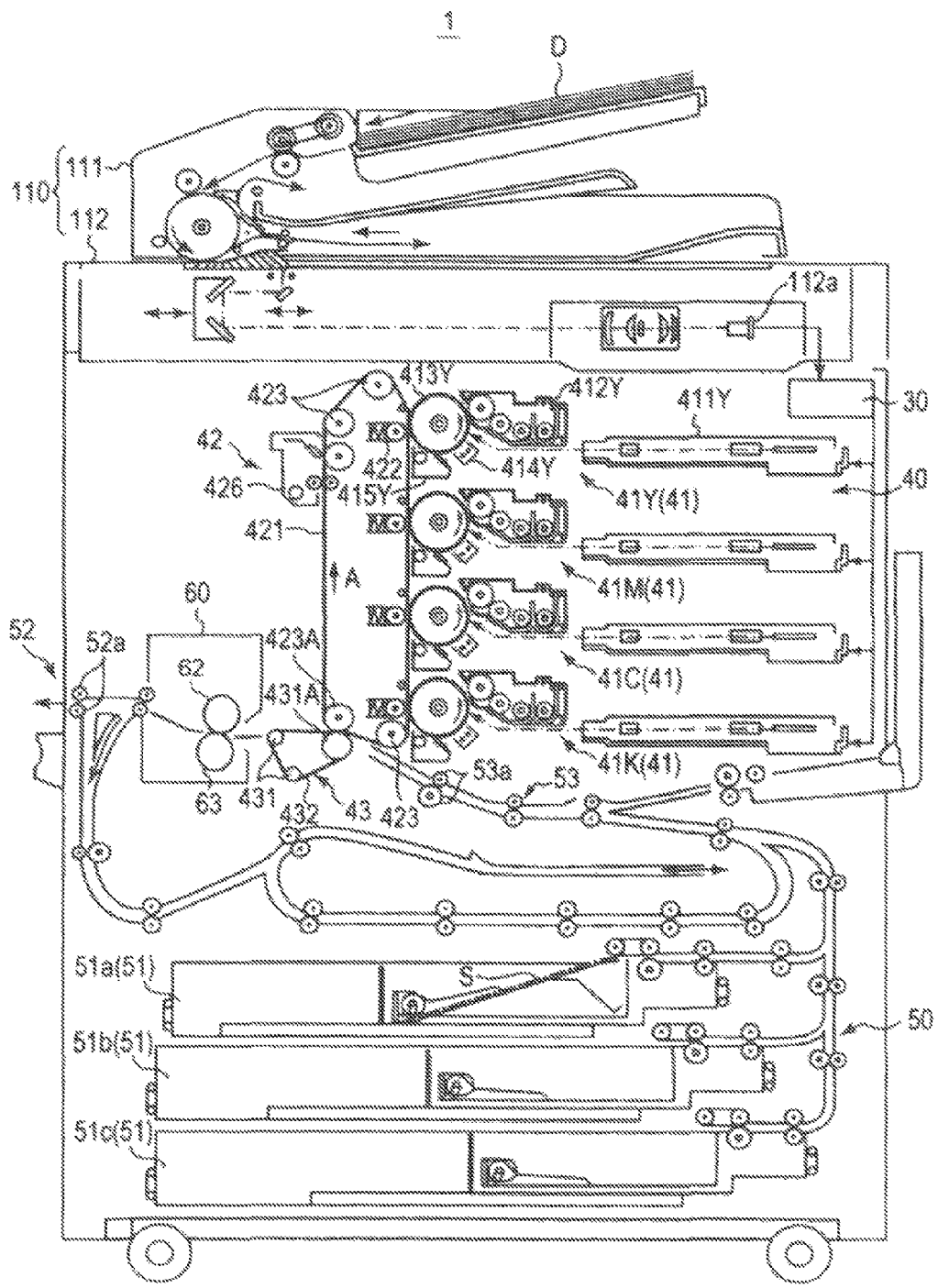
FIG. 1 is a schematic configuration diagram of an image forming apparatus according to an embodiment of the present invention.

FIG. 1 is a schematic configuration diagram of an image forming apparatus according to an embodiment of the present invention. As shown in FIG. 1, an image forming apparatus 1 includes an image reading portion 110, an image processing portion 30, an image forming portion 40, a paper transporting portion 50, and a fusing apparatus 60.

The image forming portion 40 includes image forming units 41 (41Y, 41M, 41C, and 41K) that form images of toner of Y (yellow), M (magenta), C (cyan), and K (black) colors. The image forming units 41 all have the same configuration except for toner contained therein. Thus, the letters representing the colors may be hereinafter omitted. The image forming portion 40 further includes an intermediate transfer unit 42 and a secondary transfer unit 43.

Each image forming unit 41 includes an exposure apparatus 411, a developing apparatus 412, a photoconductor drum 413, a charging apparatus 414, and a drum cleaning apparatus 415. The photoconductor drum 413 is, for example, a negative charge type organic photoconductor. A surface of the photoconductor drum 413 has photoconductivity. The photoconductor drum 413 corresponds to an image holding body that holds a toner image.

The charging apparatus 414 is, for example, a corona charger. The charging apparatus 414 maybe a contact charging apparatus that brings a contact charging member, such as a charging roller, a charging brush, or a charging blade, into contact with the photoconductor drum 413 to charge the photoconductor drum 413. The exposure apparatus 411 is composed of, for example, a semiconductor laser. The developing apparatus 412 is, for example, a developing apparatus of a two-component development system.

The intermediate transfer unit 42 includes an intermediate transfer belt 421; primary transfer rollers 422 that bring the intermediate transfer belt 421 into contact by pressure with their corresponding photoconductor drums 413; a plurality of support rollers 423 including a backup roller 423A; and a belt cleaning apparatus 426. The intermediate transfer belt 421 is an endless belt.

The intermediate transfer belt 421 is stretched in a loop manner by the plurality of support rollers 423 and is movable. The intermediate transfer belt 421 runs at a constant speed in a direction of arrow A by rotation of at least one drive roller among the plurality of support rollers 423.

The secondary transfer unit 43 includes a secondary endless transfer belt 432; and a plurality of support rollers 431 including a secondary transfer roller 431A. The secondary transfer belt 432 is stretched in a loop manner by the secondary transfer roller 431A and the support rollers 431.

The fusing apparatus 60 includes a fusing roller 62 that heats and melts toner which forms toner images on a sheet of paper S; and a pressure roller 63 that presses the sheet of paper S against the fusing roller 62.

The image reading portion 110 includes an automatic document feeding apparatus 111 and a document image scanning apparatus 112 (scanner). The paper transporting portion 50 includes a paper feeding portion 51, a paper discharge portion 52, and a transport path portion 53. Three paper feed tray units (51a to 51c) forming the paper feeding portion 51 contain sheets of paper S (standard paper or special paper) for different preset types. The sheets of paper S are identified based on basis weight, size, or the like. The transport path portion 53 has a plurality of pairs of transport rollers such as a pair of resist rollers 53a.

Next, an image formation process performed by the image forming apparatus 1 will be described. The document image scanning apparatus 112 optically scans and reads a document D on contact glass. Reflected light from the document D is read by a CCD sensor 112a, becoming input image data. The image processing portion 30 performs predetermined image processing on the input image data, and sends the processed input image data to the exposure apparatuses 411.

The photoconductor drums 413 rotate at a constant circumferential velocity. The charging apparatuses 414 uniformly and negatively charge surfaces of their corresponding photoconductor drums 413. The exposure apparatuses 411 irradiate the photoconductor drums 413 with laser light relevant to the input image data of each color component.

In this manner, electrostatic latent images are formed on the surfaces of the photoconductor drums 413. The developing apparatuses 412 allow toner to be attached to the surfaces of the photoconductor drums 413, thereby visualizing the electrostatic latent images. In this manner, toner images according to the electrostatic latent images are formed on the surfaces of the photoconductor drums 413 and held on the photoconductor drums 413.

The toner images on the surfaces of the photoconductor drums 413 are transferred onto the intermediate transfer belt 421 by the intermediate transfer unit 42. Transfer remaining toner that remains on the surfaces of the photoconductor drums 413 after the transfer is removed by the drum cleaning apparatuses 415 each having a drum cleaning blade that slidingly contacts with the surface of the photoconductor drum 413.

By the intermediate transfer belt 421 coming into contact by pressure with the photoconductor drums 413 by the primary transfer rollers 422, the toner images of each color are sequentially superimposed and transferred onto the intermediate transfer belt 421. The primary transfer rollers 422, etc., correspond to a primary transfer portion that performs primary transfer of the toner images held on the photoconductor drums 413 onto a surface layer of the intermediate transfer belt 421. Transfer remaining toner that remains on the surface of the intermediate transfer belt 421 is removed by the belt cleaning apparatus 426 having a belt cleaning blade that slidingly contacts with the surface of the intermediate transfer belt 421.

The secondary transfer roller 431A is brought into contact by pressure with the backup roller 423A, with the intermediate transfer belt 421 and the secondary transfer belt 432 therebetween. By this, a transfer nip is formed. A sheet of paper S is transported by the paper transporting portion 50 to the transfer nip and passes through the transfer nip. Correction of a skew of the sheet of paper S and adjustment of transport timing are performed by a resist roller portion where the pair of resist rollers 53a is disposed.

When the sheet of paper S is transported to the transfer nip, a transfer bias is applied to the secondary transfer roller 431A. By the application of the transfer bias, the toner images held on the intermediate transfer belt 421 are transferred onto the sheet of paper S. The sheet of paper S having the toner images transferred thereonto is transported by the secondary transfer belt 432 toward the fusing apparatus 60. The secondary transfer roller 431A, etc., correspond to a secondary transfer portion that performs secondary transfer of the toner images transferred onto the intermediate transfer belt 421, onto the sheet of paper S (transfer material).

The fusing apparatus 60 heats and pressurizes the transported sheet of paper S at the nip portion. In this manner, the toner images are fused to the sheet of paper S. The sheet of paper S having the toner images fused thereto is discharged outside the apparatus 1 by the paper discharge portion 52 including paper discharge rollers 52a.

2. For the Intermediate Transfer Belt

Figure 2:
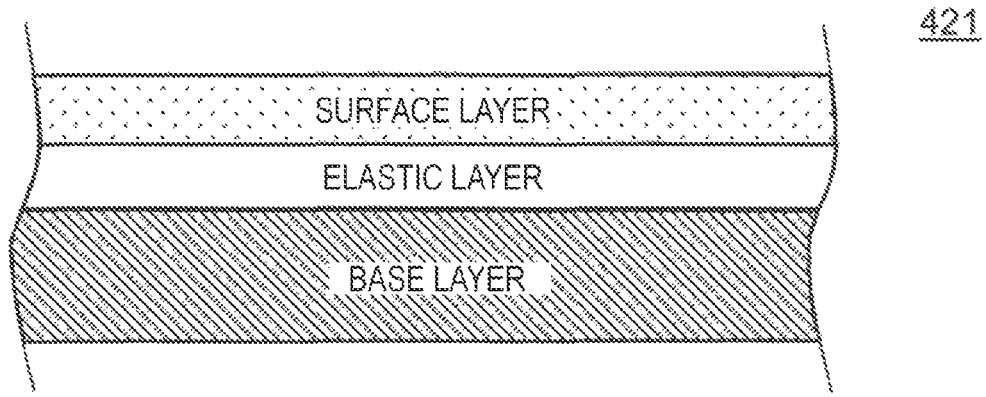
FIG. 2 is an illustrative diagram of layers of an intermediate transfer belt.

As shown in FIG. 2, the above-described intermediate transfer belt 421 is configured such that a base layer that maintains a belt form, an elastic layer that follows toner and paper, and a surface layer that releases the toner are sequentially stacked on top of each other. Here, by controlling the stress relief time $\tau$ [ms] of a material used for the elastic layer (hereinafter, simply referred to as the "stress relief time $\tau$") to an appropriate range, even if the hardness H [MPa] of the surface layer (hereinafter, simply referred to as the "hardness H") is increased to a level at which wear of the surface layer does not occur with durable use, the speed of deformation of the elastic layer upon pass-through of thick paper can be reduced. Accordingly, the surface layer also slowly deforms, which is considered to enable to suppress distortion or cracking of the surface layer.

Based on this idea, the applicant has repeated experimental evaluation, etc., which will be described later. As a result, the applicant has found that, when the stress relief time $\tau$ and the hardness H satisfy predetermined conditions (details will be revealed by the description made later), wear and cracking can be suppressed while transfer performance is satisfied. On the basis of this, the intermediate transfer belt 421 is fabricated such that the stress relief time $\tau$ and the hardness H satisfy the conditions.

Note that the stress relief time $\tau$ is the time constant of the stress relief behavior of a viscoelastic material and is an index indicating the oscillation frequency characteristic of a viscoelastic substance. Specifically, the stress relief time $\tau$ is time taken for the elastic modulus of (stress) relief to reach 1/e of an initial elastic modulus, and is represented by $\eta/G$ (where $\eta$ is the viscosity coefficient and G is the elastic modulus). When the stress relief time $\tau$ is large, generally, $\eta$ is large and thus deformation proceeds slowly. In addition, the hardness H is measured by, for example, a nanoindentation method. This method is a method in which indenter's indentation load and depth are continuously measured, and hardness or Young's modulus is calculated from a curve of the indentation depth and load.

3. For Experimental Evaluation

The aforementioned experimental evaluation will be described in detail below.

[Fabrication of Samples]

As samples for experimental evaluation, a total of 10 intermediate transfer belts of examples 1 to 5 and comparative examples 1 to 5 were fabricated. Fabrication methods for the intermediate transfer belts will be described below.

<Fabrication of an Intermediate Transfer Belt of Example 1>

First, a fabrication method for an intermediate transfer belt according to example 1 will be described.

(a) For Fabrication of an Endless Belt-like Base Material 23 parts by mass of a dried oxidized carbon black (SPECIAL BLACK 4) (manufactured by Degussa AG, pH 3.0, volatile content: 14.0%) was added and mixed in 100 parts by mass of the solid content of a "U-Varnish-S (solid content: 18 mass %)" (manufactured by Ube Industries, LTD). By this, a polyamide acid solution containing the carbon black was obtained. Note that the "U-Varnish-S" is a polyamide acid N-methyl-2-pyrrolidone (NMP) solution composed of 3,3', 4,4'-biphenyltetracarboxylic dianhydride (BPDA) and p-phenylenediamine (PDA).

In addition, a collision type disperser "Geanus PY" (manufactured by Geanus Co.) was used to mix the varnish and the carbon black. Mixing conditions were such that the pressure was 200 MPa, the minimum area of a path for a mixture was 1.4 mm2, and the number of times the mixture passed through the path was five.

The polyamide acid solution containing the carbon black was applied to an inner surface of a cylindrical mold to a thickness of 0.5 mm through a dispenser, and the mold was rotated at 1500 rpm for 15 minutes. By this, a developing layer of the solution having a uniform thickness was formed.

Then, 60° C. hot air was applied to the mold from the outside for 30 minutes while the mold was rotated at 250 rpm. Thereafter, the mold was heated at 150° C. for 60 minutes. Thereafter, the mold was heated to 360° C. at a temperature rise rate of 2° C./minute and further heated at 360° C. for 30 minutes. By this, solvent and water that is generated along with dehydration and ring closure were removed from the developing layer, completing an imidization reaction in the developing layer. Thereafter, the mold was brought back to room temperature, and a polyimide layer formed by the imidization reaction was removed from the mold. By this, an endless belt-like base layer with a thickness of 0.1 mm was obtained.

(b) For Fabrication of an Elastic Layer 30 parts by mass of a furnace black "Asahi #50" (manufactured by Asahi Carbon Co., Ltd.) and 100 parts by mass of polychloroprene "PS-40A" (manufactured by Denki Kagaku Kogyo Kabushiki Kaisha) were kneaded. The obtained kneaded matter was dissolved and dispersed in toluene so as to have a solid content concentration of 20 mass %. By this, a coating Ce1 for an elastic layer was prepared.

The base layer was placed on an outer surface of a rotatable cylindrical mold. While the mold was rotated with its central axis being a rotational axis, the coating Ce1 was applied, by spiral coating, onto an outer surface of the base layer from a nozzle and dried and subjected to a crosslinking process. By this, an elastic layer with a dry film thickness of 200 μm was fabricated. As such, the elastic layer contains a thermally crosslinking rubber material. The viscoelastic modulus Rv of the elastic layer was measured by a viscoelasticity measuring apparatus Vesmeter (manufactured by WaveCyber Corp.). The viscoelastic modulus Rv was 65%.

For Fabrication of a Surface Layer

The following components A to D were dissolved and dispersed in a solvent [propylene glycol monomethyl ether acetate (PMA)] at amounts shown below so as to have a solid content concentration of 10 mass %. By this, a coating Cs1 for a surface layer was prepared.

A: Dipentaerythritol hexaacrylate (DPHA) . . . 40 parts by mass

B: UV-3520TL (manufactured by Nippon Synthetic Chemical Industry Co., Ltd.) . . . 45 parts by mass C: MEGAFACE (registered trademark) RS-72-K (manufactured by DIC Corporation) . . . 10 parts by mass D: Surface-treated tin oxide particles . . . 2 parts by mass Note that "UV-3520TL" is polyurethane acrylate and has a number average molecular weight of 14000, a stretch rate of 320%, and a tensile strength of 408 kgf/cm2. As such, a polyurethane acrylate to be used desirably has a number average molecular weight of 10000 or more, a stretch rate of 250% or more, and a tensile strength of 200 kgf/cm2 or more.

DPHA is polyfunctional (metha)acrylate, and UV-3520TL is polyurethane (metha)acrylate. MEGAFACE RS-72-K is a polymerizable compound having a low surface energy group (in this case, a fluorine-denatured (metha)acrylate), and the surface-treated tin oxide particles are metal oxide fine particles having been subjected to surface treatment using a surface treatment agent S-5.

The coating Cs1 was applied onto an outer surface of the elastic layer by an immersion coating method using a coating apparatus. By this, a coated film was formed so as to have a dry film thickness of 2 μm. In the coating apparatus, the coating Cs1 circulated inside and outside a vessel where the elastic layer was immersed, and the amount of the coating Cs1 supplied to the vessel was 1 L/min.

In addition, the coated film was irradiated with ultraviolet rays serving as active energy rays under the following irradiation conditions, to cure the coated film. By this, a surface layer was formed. In the above-described manner, an endless belt-like intermediate transfer belt having the base layer, the elastic layer, and the surface layer stacked on top of each other in this order was able to be obtained and was used as an intermediate transfer belt of example 1. Note that the irradiation of ultraviolet rays was performed such that the base material where the coated film was formed on the outer surface of the elastic layer was rotated, with a light source fixed.

(Ultraviolet Irradiation Conditions)

Type of the light source: high-pressure mercury lamp "H04-L41" (manufactured by Eye Graphics Co., Ltd.)

Distance from the irradiation opening to the surface of the coated film: 100 mm

Amount of irradiation light: 1 J/cm$^2$

Moving (rotation) speed of the coated film: 60 mm/second

Irradiation time (a period of time during which the coated film is rotated): for 240 seconds <Fabrication of an Intermediate Transfer Belt of example 2>

Next, a fabrication method for an intermediate transfer belt according to example 2 will be described. The fabrication method for an intermediate transfer belt according to example 2 differs from that of example 1 in that the amount of polyfunctional (metha)acrylate DPHA for a surface layer is 60 parts by mass, the amount of polyurethane (metha)acrylate UV-3520TL is 30 parts by mass, and the amount of surface-treated tin oxide particles contained in a coating for the surface layer is 0 parts by mass. Others are basically the same as those of example 1, and an intermediate transfer belt was fabricated.

<Fabrication of an Intermediate Transfer Belt of Example 3>

Next, a fabrication method for an intermediate transfer belt according to example 3 will be described. The fabrication method for an intermediate transfer belt according to example 3 differs from that of example 1 in that 20 parts by mass of a thickener ("ARON A-7185" (manufactured by Toagosei Co., Ltd.), non-volatile content: 18 mass %) is added to a coating for an elastic layer, the amount of polyfunctional (metha)acrylate DPHA for a surface layer is 60 parts by mass, the amount of polyurethane (metha)acrylate UV-3520TL is 30 parts by mass, and the amount of surface-treated tin oxide particles contained in a coating for the surface layer is 0 parts by mass. Others are basically the same as those of example 1, and an intermediate transfer belt was fabricated.

<Fabrication of an Intermediate Transfer Belt of Example 4>

Next, a fabrication method for an intermediate transfer belt according to example 4 will be described. The fabrication method for an intermediate transfer belt according to example 4 differs from that of example 1 in that 10 parts by mass of a thickener ARON A-7185 is added to a coating for an elastic layer, the amount of polyfunctional (metha)acrylate DPHA for a surface layer is 60 parts by mass, the amount of polyurethane (metha)acrylate UV-3520TL is 30 parts by mass, and the amount of surface-treated tin oxide particles contained in a coating for the surface layer is 20 parts by mass. Others are basically the same as those of example 1, and an intermediate transfer belt was fabricated.

<Fabrication of an Intermediate Transfer Belt of Example 5>

Next, a fabrication method for an intermediate transfer belt according to example 5 will be described. The fabrication method for an intermediate transfer belt according to example 5 differs from that of example 1 in that 30 parts by mass of a thickener ARON A-7185 is added to a coating for an elastic layer, the amount of polyfunctional (metha)acrylate DPHA for a surface layer is 60 parts by mass, the amount of polyurethane (metha)acrylate UV-3520TL is 30 parts by mass, and the amount of surface-treated tin oxide particles contained in a coating for the surface layer is 20 parts by mass. Others are basically the same as those of example 1, and an intermediate transfer belt was fabricated.

<Fabrication of an Intermediate Transfer Belt of Comparative Example 1>

Next, a fabrication method for an intermediate transfer belt according to comparative example 1 will be described. The fabrication method for an intermediate transfer belt according to comparative example 1 differs from that of example 1 in that the amount of surface-treated tin oxide particles contained in a coating for a surface layer is 0 parts by mass. Others are basically the same as those of example 1, and an intermediate transfer belt was fabricated.

<Fabrication of an Intermediate Transfer Belt of Comparative Example 2>

Next, a fabrication method for an intermediate transfer belt according to comparative example 2 will be described. The fabrication method for an intermediate transfer belt according to comparative example 2 differs from that of example 1 in that polychloroprene "PS-40A" for an elastic layer is replaced with polychloroprene "S-40A" (manufactured by Denki Kagaku Kogyo Kabushiki Kaisha) and the amount of surface-treated tin oxide particles contained in a coating for a surface layer is 3 parts by mass. Others are basically the same as those of example 1, and an intermediate transfer belt was fabricated.

<Fabrication of an Intermediate Transfer Belt of Comparative Example 3>

Next, a fabrication method for an intermediate transfer belt according to comparative example 3 will be described. The fabrication method for an intermediate transfer belt according to comparative example 3 differs from that of example 1 in that polychloroprene "PS-40A" for an elastic layer is replaced with polychloroprene "S-40A", 10 parts by mass of a thickener ARON A-7185 is added to a coating for the elastic layer, the amount of polyfunctional (metha)acrylate DPHA for a surface layer is 60 parts by mass, the amount of polyurethane (metha)acrylate UV-3520TL is 30 parts by mass, and the amount of surface-treated tin oxide particles contained in a coating for the surface layer is 10 parts by mass. Others are basically the same as those of example 1, and an intermediate transfer belt was fabricated.

<Fabrication of an Intermediate Transfer Belt of Comparative Example 4>

Next, a fabrication method for an intermediate transfer belt according to comparative example 4 will be described. The fabrication method for an intermediate transfer belt according to comparative example 4 differs from that of example 1 in that 10 parts by mass of a thickener ARON A-7185 is added to a coating for an elastic layer, the amount of polyfunctional (metha)acrylate DPHA for a surface layer is 60 parts by mass, the amount of polyurethane (metha)acrylate UV-3520TL is 30 parts by mass, and the amount of surface-treated tin oxide particles contained in a coating for the surface layer is 30 parts by mass. Others are basically the same as those of example 1, and an intermediate transfer belt was fabricated.

<Fabrication of an Intermediate Transfer Belt of Comparative Example 5>

Next, a fabrication method for an intermediate transfer belt according to comparative example 5 will be described. The fabrication method for an intermediate transfer belt according to comparative example 5 differs from that of example 1 in that 30 parts by mass of a thickener ARON A-7185 is added to a coating for an elastic layer and the amount of polyurethane (metha)acrylate UV-3520TL for a surface layer is 0 parts by mass. Others are basically the same as those of example 1, and an intermediate transfer belt was fabricated.

[Measurement of Hardness H]

Next, a technique for measuring the aforementioned hardness H will be described. For the above-described samples (examples 1 to 5 and comparative examples 1 to 5), hardness H was measured under the following measurement conditions, using "TriboScope" (manufactured by Hysitron, Inc.). More specifically, the probe's applied load was changed in increments of 0.3 µN over the range of 0.1 µN to 30 µN, and measurement data was collected until the probe's indentation depth exceeded 200 µm, and hardness H was calculated from a load curve with up to an indentation depth of 50 µm. An average value of calculated values obtained when 10 points were randomly measured was used as hardness H.

(Measurement Conditions)

Dimensions of a test piece to be measured: 10 mm×10 mm (a belt sample was cut out or a sample for measurement was separately fabricated)

Measuring indenter: Berkovich diamond indenter

Shape of the tip of the measuring indenter: regular triangle

Measurement environment: 23° C. and 50 to 60% RH

[Measurement of Stress Relief Time $\tau$]

Next, a technique for measuring the aforementioned stress relief time $\tau$ will be described. For the above-described samples (examples 1 to 5 and comparative examples 1 to 5), stress relief time $\tau$ was measured under the following measurement conditions, using "Vesmeter E-200DT" (manufactured by WaveCyber Corp.). More specifically, a test piece was set and an average value of displayed measured values of relief time obtained when 10 points were randomly measured was used as stress relief time $\tau$.

(Measurement Conditions)

Dimensions of a test piece to be measured: 10 mm×10 mm or more (a belt sample was cut out or a sample for measurement was separately fabricated)

Thickness of the test piece to be measured: 1.5 mm or more (when a test piece is a thin film, a plurality of test pieces are stacked so as to have a thickness of 1.5 mm or more)

Measuring head: head D (conforming to a JIS type D hardness tester)

Measurement environment: 23° C. and 50 to 60% RH

[Measurement Results of the Hardness H and the Stress Relief Time $\tau$]

The above-described samples (examples 1 to 5 and comparative examples 1 to 5) were measured using the above-described techniques for measuring hardness H and stress relief time $\tau$. Results shown below were obtained.

EXAMPLE 1

Hardness H=70 [MPa] and Stress Relief Time $\tau$=0.6 [ms]

EXAMPLE 2

Hardness H=120 [MPa] and Stress Relief Time $\tau$=0.6 [ms]

EXAMPLE 3

Hardness H=120 [MPa] and Stress Relief Time $\tau$=0.85 [ms]

EXAMPLE 4

Hardness H=140 [MPa] and Stress Relief Time $\tau$=0.75 [ms]

EXAMPLE 5

Hardness H=140 [MPa] and Stress Relief Time $\tau$=1.0 [ms]

COMPARATIVE EXAMPLE 1

Hardness H=50 [MPa] and Stress Relief Time $\tau$=0.6 [ms]

COMPARATIVE EXAMPLE 2

Hardness H=80 [MPa] and Stress Relief Time $\tau$=0.5 [ms]

COMPARATIVE EXAMPLE 3

Hardness H=130 [MPa] and Stress Relief Time $\tau$=0.55 [ms]

COMPARATIVE EXAMPLE 4

Hardness H=150 [MPa] and Stress Relief Time $\tau$=0.8 [ms]

COMPARATIVE EXAMPLE 5

Hardness H=440 [MPa] and Stress Relief Time $\tau$=1.0 [ms]

[Evaluation Methods]

Next, evaluation methods for the performance of the above-described samples (examples 1 to 5 and comparative examples 1 to 5) will be described. The fabricated intermediate transfer belts of each sample were sequentially mounted on an image forming apparatus "C6000" (manufactured by Konica Minolta, Inc.), and an evaluation is performed on three items: (a) the transfer performance of rough paper, (b) the wear (abrasion) of the surface layer, and (c) the cracking of the surface layer. Evaluation conditions, etc., for each item are as follows.

(a) Transfer Performance of Rough Paper

Evaluation paper: rough paper "LEATHAC 66 (260 g) paper" (manufactured by Tokushu Tokai Paper Co., Ltd./A4 size)

Evaluation pattern: fully solid blue image

Evaluation procedure:

I. A fully solid blue image is obtained while changing a secondary transfer bias (current), and an image with the best transfer performance is used as an evaluation sample.

II. The image density of the evaluation sample is measured. A measurement method is adopted in which an image is captured by a scanner, and an average density is calculated by image processing using Photoshop (image processing software developed by Adobe Systems Incorporated).

Evaluation criteria: an evaluation is performed at four levels: ⊙ (the area ratio with an average density of 85% or less is 3% or less), ○ (the area ratio with an average density of 85% or less is 5% or less), Δ (the area ratio with an average density of 85% or less is 7% or less), and × (the area ratio with an average density of 85% or less exceeds 7%).

(b) Wear (Abrasion) of the Surface Layer

Evaluation paper: Konica Minolta J paper (A4 size)

Evaluation pattern: a character pattern with a color/white ratio of 20%

Evaluation procedure:

I. 100,000 sheets of paper are allowed to continuously pass through using the above-described paper and the above-described evaluation pattern.

II. The surface conditions of the intermediate transfer belt after paper pass-through evaluation are observed using a digital microscope. Note that "BS-D8000 III" (manufactured by Sonic Group) is used as the scope and the observation magnification is 3200×.

Evaluation criteria: an evaluation is performed at two levels: ○ (wear does not occur) and × (wear occurs).

(c) Cracking of the Surface Layer

Evaluation paper: Color Copy 300 [300 g/m2] (manufactured by mondi/A4 size)

Evaluation pattern: fully solid white

Evaluation procedure:

I. 100,000 sheets of paper are allowed to continuously pass through using the above-described paper and the above-described evaluation pattern.

II. The surface conditions of the intermediate transfer belt (edge portions of the evaluation paper) after paper pass-through evaluation are observed using a digital microscope. Note that "BS-D8000 III" (manufactured by Sonic Group) is used as the scope and the observation magnification is 960×.

Evaluation criteria: an evaluation is performed at two levels: ○ (cracking does not occur) and × (cracking occurs).

[Evaluation Results and Consideration]

Results obtained by evaluating the performance of the samples (examples 1 to 5 and comparative examples 1 to 5) by the above-described evaluation methods are shown in table 1. As shown in table 1, in the case of examples 1 to 5, results with no problems (⊙ or ○) were obtained for all of the items, abrasion, cracking, and the transfer performance of rough paper. Of those results, especially, in the case of examples 1 to 3, particularly desirable results (⊙) were obtained in terms of the transfer performance of rough paper. On the other hand, in the case of comparative examples 1 to 5, undesirable results (×) were obtained for at least one of the items, abrasion, cracking, and the transfer performance of rough paper.

TABLE 1

| | | | Evaluation results | | |
|---|---|---|---|---|---|
| | Hardness H [MPa] | Stress relief time $\tau$ [ms] | Abrasion | Cracking | Transfer performance of rough paper |
| Example 1 | 70 | 0.6 | ○ | ○ | ⊙ |
| Example 2 | 120 | 0.6 | ○ | ○ | ⊙ |
| Example 3 | 120 | 0.85 | ○ | ○ | ⊙ |
| Example 4 | 140 | 0.75 | ○ | ○ | ○ |
| Example 5 | 140 | 1 | ○ | ○ | ○ |
| Comparative example 1 | 50 | 0.6 | × | ○ | ⊙ |
| Comparative example 2 | 80 | 0.5 | ○ | × | ⊙ |
| Comparative example 3 | 130 | 0.55 | ○ | × | ○ |
| Comparative example 4 | 150 | 0.8 | ○ | × | Δ |
| Comparative example 5 | 440 | 1.0 | ○ | × | × |

Figure 3:
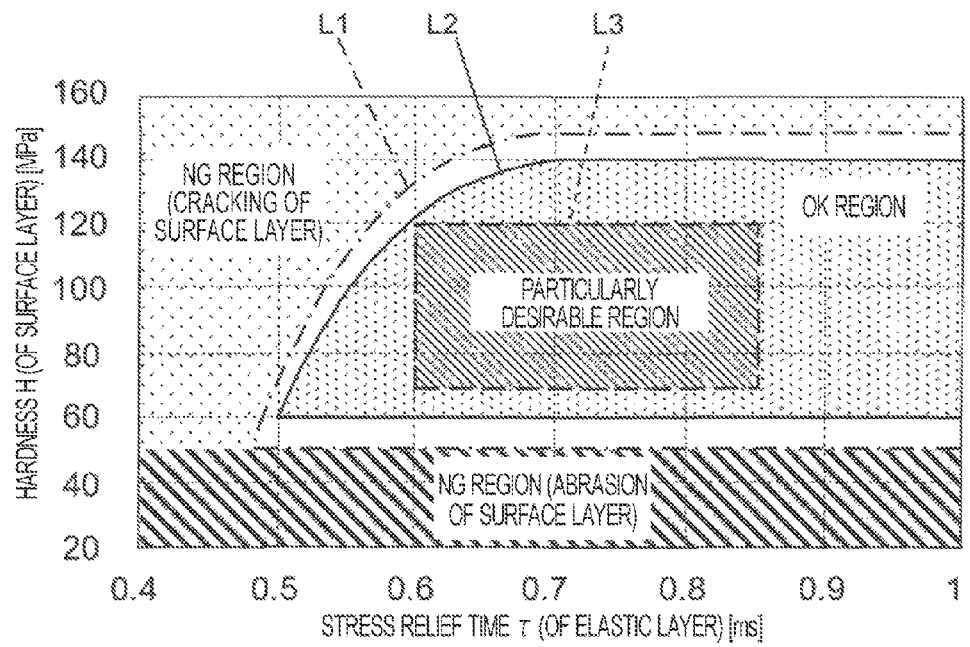
FIG. 3 is a graph of a relationship between the characteristics and performance of an intermediate transfer belt.
Figure 4:
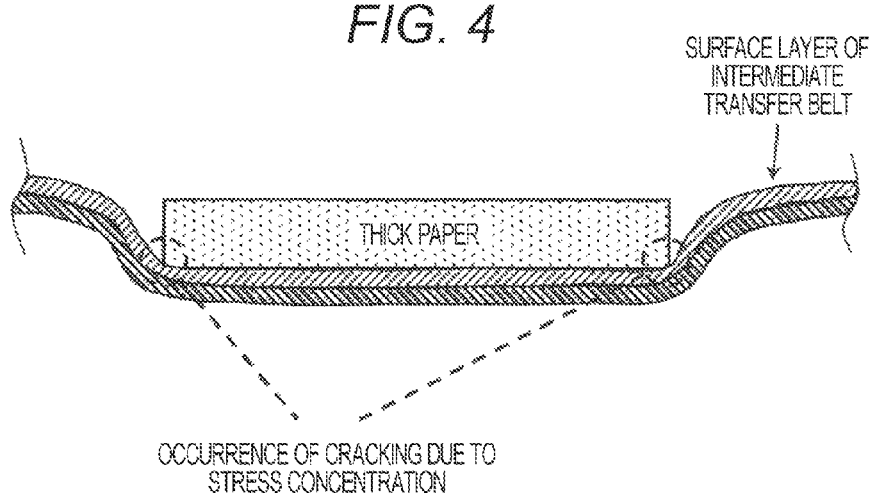

FIG. 3 shows a relationship between the characteristics (hardness H and stress relief time $\tau$) and performance (abrasion, cracking, and whether the transfer performance of rough paper is good or poor) of the intermediate transfer belt, which is obtained based on the above-described evaluation results. Note that in FIG. 3 the horizontal axis represents stress relief time $\tau$ and the vertical axis represents hardness H.

Line L1 shown in FIG. 3 corresponds to a boundary line between an NG region (an undesirable region where cracking or abrasion of the surface layer occurs) and a region that is not the NG region. Namely, a region enclosed by line L1 represents a region that is not the NG region. The region is a part of a region satisfying $0.48 < \tau$ that is represented by $50 < H < 6275\tau^3 - 13820\tau^2 + 10140\tau - 2330$ when $0.48 < \tau < 0.75$ and represented by $50 < H < 150$ when $0.75 \leq \tau$.

From this fact, cracking or abrasion of the intermediate transfer belt is suppressed in the case in which the stress relief time $\tau$ and the hardness H satisfy a first condition that $0.48 < \tau < 0.75$ and $50 < H < 6275\tau^3 - 13820\tau^2 + 10140\tau - 2330$ or a second condition that $0.75 \leq \tau$ and $50 < H < 150$, over the case in which the stress relief time $\tau$ and the hardness H do not satisfy the first condition or the second condition.

In addition, line L2 shown in FIG. 3 corresponds to a boundary line between an OK region (a region where cracking or abrasion of the surface layer is less likely to occur and the transfer performance is good) and a region that is not the OK region. Namely, a region enclosed by line L2 represents the OK region. The region is a part of a region satisfying $0.5 \leq \tau$ that is represented by $60 \leq H \leq 5333\tau^3 - 12000\tau^2 + 8987\tau - 2100$ when $0.5 \leq \tau < 0.75$ and represented by $60 \leq H \leq 140$ when $0.75 \leq \tau$.

From this fact, better performance is obtained in the case in which the stress relief time $\tau$ and the hardness H satisfy a third condition that $0.5 \leq \tau < 0.75$ and $60 \leq H \leq 5333\tau^3 - 12000\tau^2 + 8987\tau - 2100$ or a fourth condition that $0.75 \leq \tau$ and $60 \leq H \leq 140$. Note that when the third condition or the fourth condition is satisfied, the first condition or the second condition is naturally satisfied.

In addition, line L3 shown in FIG. 3 corresponds to a boundary line between a particularly desirable region (a region where cracking or abrasion of the surface layer is less likely to occur and the transfer performance is very good) and the OK region. Namely, a region enclosed by line L3 represents the particularly desirable region. The region is represented by 70≤H≤120 in a range of 0.6≤τ≤0.85.

From this fact, particularly good performance is obtained in the case in which the stress relief time τ and the hardness H satisfy a fifth condition that 0.6≤τ≤0.85 and 70≤H≤120. Note that when the fifth condition is satisfied, the third condition or the fourth condition is naturally satisfied.

From the above, basically, it is most desirable to adjust the stress relief time τ and hardness H of the intermediate transfer belt so as to satisfy the above-described fifth condition (e.g., to be equivalent to example 1). By this, both of the adjustment of the hardness H to suppress wear of the surface caused by friction of contact members and the adjustment of stress relief time τ to suppress the occurrence of cracking when thick paper passes through can be achieved vary favorably.

Note, however, that, for example, when such adjustment cannot be performed for some reason, it is desirable to perform adjustment to satisfy the above-described third condition or fourth condition. Furthermore, when even such adjustment cannot be performed, it is desirable to perform adjustment to satisfy the above-described first condition or second condition.

Note that in a conventional intermediate transfer belt having an elastic layer and a surface layer, in general, the stress relief time τ and the hardness H do not satisfy any of the first to fifth conditions. As an example, an elastic intermediate transfer belt of an "imagePRESS C7000VP" (manufactured by Canon Inc.) was examined. The results shown in the above-described comparative example 5 (any of the first to fifth conditions was not satisfied) were obtained. In view of such circumstances, it can be said that an intermediate transfer belt formed to satisfy any of the first to fifth conditions has excellent features that the conventional ones do not have.

While the embodiments according to the present invention have been described herein, the subject matters of the present invention are not limited to the embodiments. Various modifications may be made to the embodiments without departing from the scope of the present invention.

The present invention can be used for an image forming apparatus of an electrophotographic system, etc.

According to an embodiment of the present invention, an intermediate transfer belt makes it easier to suppress wear and cracking while transfer performance is satisfied. In addition, according to an image forming apparatus according to an embodiment of the present invention, advantages provided by the intermediate transfer belt according to the embodiment of the present invention can be provided.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An intermediate transfer belt used for an image forming apparatus of an electrophotographic system, the intermediate transfer belt comprising:
   an elastic layer; and
   a surface layer formed on the elastic layer, wherein
   stress relief time τ [ms] of a material used for the elastic layer and hardness H [MPa] of the surface layer satisfy a first condition that $0.48<\tau<0.75$ and $50<H<6275\tau^3-13820\tau^2+10140\tau-2330$ or a second condition that $0.75\leq\tau$ and $50<H<150$.

2. The intermediate transfer belt according to claim 1, wherein
   the stress relief time τ and the hardness H satisfy a third condition that $0.5\leq\tau\leq0.75$ and $60\leq H\leq5333\tau^3-12000\tau^2+8987\tau-2100$ or a fourth condition that $0.75\leq\tau$ and $60\leq H\leq140$.

3. The intermediate transfer belt according to claim 2, wherein
   the stress relief time τ and the hardness H satisfy a fifth condition that $0.6\leq\tau\leq0.85$ and $70\leq H\leq120$.

4. The intermediate transfer belt according to claim 1, wherein the material used for the elastic layer contains a thermally crosslinking rubber material.

5. The intermediate transfer belt according to claim 1, wherein material used for the surface layer is such that surface-treated metal oxide fine particles are contained in a cured resin obtained by curing an active energy ray-curable composition containing polyfunctional (metha)acrylate, polyurethane acrylate, and a polymerizable compound having a low surface energy group.

6. The intermediate transfer belt according to claim 5, wherein the polymerizable compound having a low surface energy group is a fluorine-denatured (metha)acrylate.

7. The intermediate transfer belt according to claim 5, wherein the polyurethane acrylate has a number average molecular weight of 10000 or more, a stretch rate of 250% or more, and a tensile strength of 200 kgf/cm2 or more.

8. An image forming apparatus comprising:
   an image holding body that holds a toner image;
   the movable intermediate transfer belt according to claim 1;
   a primary transfer portion that performs primary transfer of the toner image held on the image holding body onto a surface layer of the intermediate transfer belt; and
   a secondary transfer portion that performs secondary transfer of the toner image transferred onto the intermediate transfer belt, onto a transfer material.

* * * * *